United States Patent
Smith

[15] 3,675,112
[45] July 4, 1972

[54] STANDBY POWER SYSTEM

[72] Inventor: Peter B. Smith, Monroe, Conn.
[73] Assignee: Dynamics Corporation of America, New York, N.Y.
[22] Filed: July 9, 1970
[21] Appl. No.: 53,432

[52] U.S. Cl..........................................322/4, 74/665, 60/53, 290/4 R, 290/4 D, 290/30 A, 322/29, 322/31
[51] Int. Cl..................................................H02k 7/02
[58] Field of Search.................322/4, 29, 31, 32; 290/4 R, 290/4 D, 30 A; 74/665; 60/53

[56] References Cited

UNITED STATES PATENTS

| | | | |
|---|---|---|---|
| 3,477,013 | 11/1969 | Smith | 322/4 |
| 3,296,451 | 1/1967 | Van Ausdal et al | 322/4 X |
| 2,911,541 | 11/1959 | Neufville et al | 322/4 X |
| 3,345,517 | 10/1967 | Smith | 290/4 R |
| 3,283,165 | 11/1966 | Bloch | 290/4 R |

*Primary Examiner*—Lewis H. Myers
*Assistant Examiner*—H. Huberfeld
*Attorney*—J. T. Martin et al.

[57] ABSTRACT

A standby generator having a flywheel storage system coupled to the standby engine. The flywheel is also coupled to the motor generator set through a hydrostatic transmission system including a fixed stroke hydraulic motor and a variable stroke hydraulic pump.

3 Claims, 1 Drawing Figure

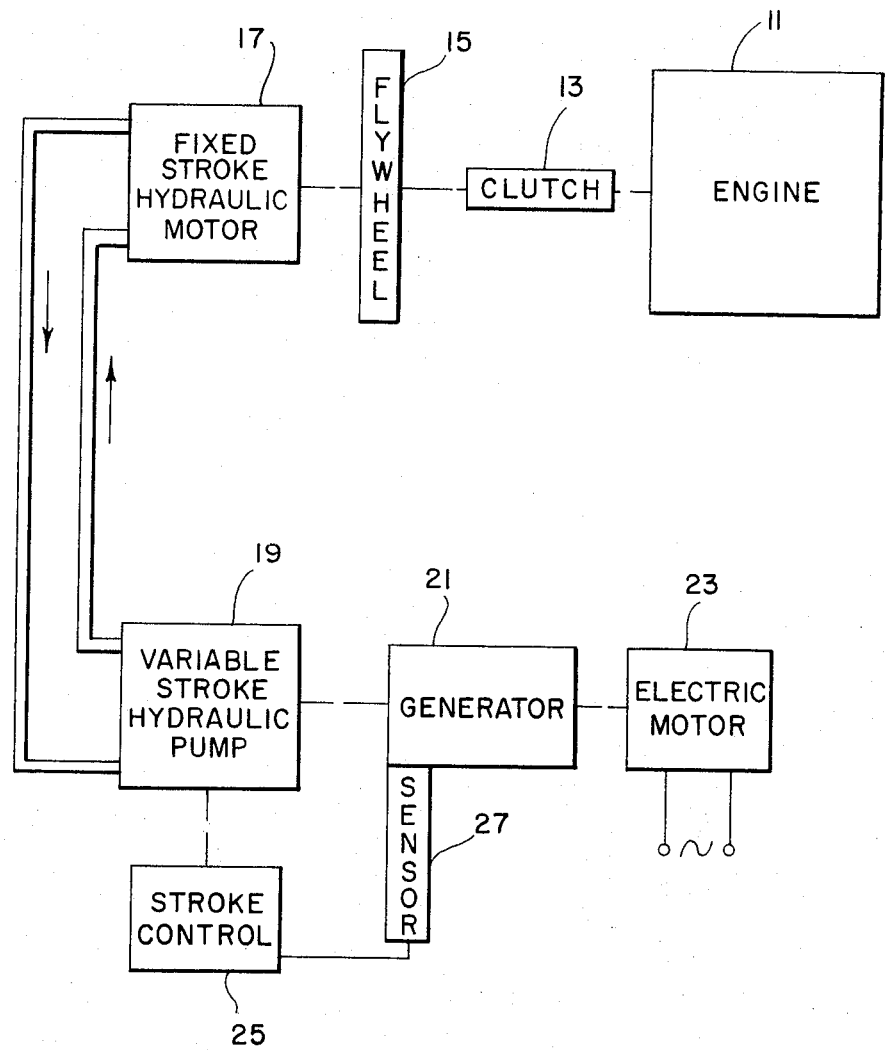

STANDBY POWER SYSTEM

This invention relates generally to a standby generating system and more specifically to a combined hydraulic-flywheel storage system for use with a standard standby generating system.

The basic standby generating system consists normally of a motor-generator set with the motor being coupled to a standard power source so as to provide the desired power supply to the system from the generator. Also, coupled to the generator is a standby engine, such as a diesel engine or an internal combustion engine, with the necessary connections being provided so as to start the standby engine upon the failure of the commercial power supply.

One of the problems involved with the basic standby power system is that there is a complete failure in the power supply, or substantially a complete failure, so that any equipment being operated thereby may malfunction during the transfer to the emergency system. Several methods have been devised in order to overcome this momentary power interruption. The best-known system relates to the use of a large flywheel which is driven by the generator so as to store energy while the system is operating normally. Upon failure of the power supply, the flywheel continues to rotate and, therefore, continues to drive the generator until the standby engine is energized and reaches a normal operating speed. Another system which has been proposed is to use a hydraulic system with pressure storage coupled to the generator so that a failure results in a hydraulic pump driving the generator during the period of time that it is required for the standby engine to attain the necessary speed.

A system showing the use of a standby generator having a flywheel storage system and an associated hydrostatic transmission is described in my U.S. Pat. No. 3,477,013. Basically that system consists of a standard motor-generator-engine combination with a clutch interconnecting the engine with the motor generator. A fixed stroke hydraulic pump is mechanically coupled to the motor generator and hydraulically coupled to a variable stroke hydraulic motor. The hydraulic motor, in turn, is mechanically coupled to a flywheel. Due to the designed displacement of the hydraulic motor, the flywheel is driven at twice the speed of the motor-generator. If there is a failure in the commercial power supply, the flywheel continues to rotate and transfers power through the hydraulic system. A stroke control increases the stroke as the flywheel decreases in speed so as to maintain the ratio of the driven motor and the flywheel speed to the fixed displacement equal. Accordingly, the flywheel energy may be used even when it is rotating at a speed below that of the motor generator. For a more complete description of this system, reference is hereby made to the above-identified patent.

However, it has been found that certain advantages may be obtained through the use of a modification of the above system.

Accordingly, it is an object of this invention to provide a standby power supply system using a flywheel and a exemplary hydraulic motor-pump associated therewith.

A further object of the invention is to provide a flywheel-hydraulic system for use with a standby engine which maintains a substantially constant speed or frequency out put of the generator during changeover.

These and other objects of the invention will become obvious from the following description when taken in conjunction with the single FIGURE of the drawing which is a schematic illustration of the system of the present invention.

Broadly speaking, the invention consists of a standby engine which is coupled to a flywheel by means of a clutch. The flywheel is also directly coupled to a fixed stroke hydraulic motor which is, in turn, hydraulically coupled to a variable stroke hydraulic pump. The variable stroke hydraulic pump is coupled to a motor generator set and is driven thereby during normal operation. Also, during such operation, the flywheel is driven at a constant speed by the motor generator and is disconnected from the engine. Upon failure of the power supply, the decrease in speed of the generator is sensed and the stroke of the hydraulic pump is varied so as to drive the generator at constant speed as the speed of the flywheel reduces. When the engine attains the proper speed, the clutch engages whereby the engine drives the flywheel and the generator through the hydraulic system.

Turning now more specifically to the drawing, there is illustrated a standby engine 11 which is coupled to a flywheel 15 by means of a clutch 13. Since the engine 11 is only used when the commercial power supply fails, clutch 13 is disengaged during normal operation.

The flywheel 15 is directly coupled to a fixed stroke hydraulic motor 17 which is, in turn, hydraulically coupled to a variable stroke hydraulic pump 19. The variable stroke pump 19 is directly coupled to the generator 21 and electric motor 23.

As may be seen, during initial startup conditions, the flywheel 15 will be accelerated by the electric motor 23 through the hydraulic transmission. Once the flywheel has attained speed, pressure in the hydraulic transmission is low since it is only necessary to compensate for efficiency losses.

Upon failure of the power supply, the energy stored in the flywheel 15 will be transferred to the generator through the hydraulic transmission. For flywheels coupled directly to generators, as in many known systems, the generator will slow down as the flywheel loses speed. However, the hydraulic transmission of the present invention maintains the speed of the generator constant as the speed of the flywheel decreases.

In order to accomplish this constant speed, the displacement of the hydraulic pump 19 must become proportionately less than the displacement of the hydraulic motor 17.

If either the power is restored or engine 11 is cut into the system, the flywheel 15 must be re-accelerated.

This indicates that it is desirable to have a fixed hydraulic motor coupled to the flywheel and a variable stroke pump coupled to the generator. It is recognized that when the system reverses, the "pump" and the "motor" change functions. However, for purposes of clarity the single term is used for each so as to maintain separate identity.

The system as shown operates as follows:

Variable pump 19 has substantially zero displacement when motor 23 and generator 21 reach normal speed and the displacement will slowly increase to a maximum. During this time, the pressure in the system will begin to rapidly increase since small displacement requires large pressure for a high torque. However, since pressures are high, torque at the flywheel will be very high compared to the input torque.

While motor 23 is running at normal speed, the displacement of pump 19 is fixed with hydraulic pressure depending on horsepower losses to drive the flywheel 15.

Upon failure of the power supply, a decrease in speed is sensed by means such as sensor 27. The sensor may be any of the well-known types such as a magnetic pickup or magnetic electronic tachometer. A signal from sensor 27 actuates stroke control 25. As the flywheel speed decreases, the displacement of variable stroke hydraulic pump 19 is decreased so as to maintain the generator at constant speed.

If the power supply is immediately restored, the displacement of pump 19 will increase to maximum displacement so as to accelerate flywheel 15 to maximum speed.

However, if power failure continues, engine 11 will attain operating speed and will be coupled to the system by clutch 13. The clutch may be any of the well-known devices such as an automatic over-running clutch, an electric clutch or a hydraulic clutch. Therefore, the flywheel will be accelerated and the displacement of variable stroke hydraulic pump 19 will increase to maximum.

As can be seen, with the system as shown, the flywheel can be accelerated by either the engine or by the motor through the hydraulic transmission so that transfer of energy in the system during any existing condition is accomplished with maximum efficiency.

The above description and accompanying drawing are exemplary only and are not to be considered as limiting the scope of the invention as defined by the following claims.

I claim:

1. A standby power generating system comprising
a motor-generator set,
a fuel powered engine,
a variable stroke hydraulic pump directly coupled to said motor-generator set,
a fixed stroke hydraulic motor hydraulically directly coupled to said pump,
a flywheel system directly coupled to the output of said fixed stroke hydraulic motor,
means coupled to said motor generator set for varying the stroke of said pump in response to a variation in the speed of said motor generator, and
clutch means for coupling said flywheel to said engine.

2. The power generating system of claim 1 wherein said flywheel system is normally driven at a rate substantially greater than the rate of operation of said generator.

3. The power generating system of claim 1 wherein said means coupled between said motor-generator set and said hydraulic pump comprises
a tachometer sensor connected to said motor-generator set, and
a mechanical stroke control connected to said hydraulic pump and responsive to the output of said tachometer sensor.

* * * * *